United States Patent
Wasily

(10) Patent No.: US 9,629,150 B2
(45) Date of Patent: Apr. 18, 2017

(54) PERMITTING MEDIA CONTENTION IN THE PRESENCE OF CONFLICTING DIFFERENT WIRELESS OPERATIONS

(71) Applicant: Atmel Corporation, San Jose, CA (US)

(72) Inventor: Nabil Yousef Wasily, Foothill Ranch, CA (US)

(73) Assignee: Atmel Corporation, San Jose, CA (US)

( * ) Notice: Subject to any disclaimer, the term of this patent is extended or adjusted under 35 U.S.C. 154(b) by 311 days.

(21) Appl. No.: 13/904,765

(22) Filed: May 29, 2013

(65) Prior Publication Data

US 2013/0322412 A1 Dec. 5, 2013

Related U.S. Application Data

(60) Provisional application No. 61/652,665, filed on May 29, 2012.

(51) Int. Cl.
*H04W 72/04* (2009.01)
*H04W 74/08* (2009.01)
*H04W 74/04* (2009.01)

(52) U.S. Cl.
CPC ....... *H04W 72/0446* (2013.01); *H04W 74/08* (2013.01); *H04W 74/085* (2013.01); *H04W 74/0833* (2013.01); *H04W 74/04* (2013.01); *H04W 74/0808* (2013.01); *H04W 74/0841* (2013.01)

(58) Field of Classification Search
CPC ..... H04L 74/04; H04L 74/08; H04L 74/0808; H04L 74/0816; H04L 74/0825; H04L 74/0833; H04L 74/0841
USPC .......................................................... 370/336
See application file for complete search history.

(56) References Cited

U.S. PATENT DOCUMENTS

| 2005/0063408 A1* | 3/2005 | Famolari | H04W 72/0446 370/431 |
| 2007/0197256 A1* | 8/2007 | Lu et al. | 455/552.1 |
| 2010/0284380 A1* | 11/2010 | Banerjee | H04W 16/14 370/338 |
| 2011/0059768 A1* | 3/2011 | Pandruvada | H04W 88/06 455/552.1 |
| 2011/0080898 A1* | 4/2011 | Cordeiro | H04B 7/0617 370/338 |

(Continued)

*Primary Examiner* — Warner Wong
*Assistant Examiner* — Mewale Ambaye
(74) *Attorney, Agent, or Firm* — Fish & Richardson P.C.

(57) ABSTRACT

Unbiased media contention in the presence of conflicting wireless operation of data transmission includes beginning media contention only during Bluetooth® operation; treating the Bluetooth® operation as a rejection of media transmission; holding a backoff timer associated with a backoff period steady for a specified duration; upon immediate completion of the Bluetooth® operation, WiFi contends with a small backoff value when media access is busy; using a small random number for the backoff period during a non-Bluetooth® data transfer period; and keeping an overall backoff timer unbiased for a duration of the data transmission. The specified duration may include an end of the Bluetooth® operation or a maximum backoff time that is reached. The random number for the backoff period includes uniform distribution in a contention window. A mean backoff timer value equals a uniform mean value minus a ratio of a Bluetooth® operation period to a total backoff period.

10 Claims, 5 Drawing Sheets

(56) References Cited

U.S. PATENT DOCUMENTS

2011/0153818 A1* 6/2011 Vandwalle et al. ........... 709/224
2011/0249568 A1* 10/2011 Desai et al. .................. 370/242
2012/0207040 A1* 8/2012 Comsa .............. H04W 72/1215
　　　　　　　　　　　　　　　　　　　　370/252

* cited by examiner

PERMITTING MEDIA CONTENTION IN THE PRESENCE OF CONFLICTING DIFFERENT WIRELESS OPERATIONS

CROSS-REFERENCE TO RELATED APPLICATIONS

This application claims priority to U.S. Provisional Application Ser. No. 61/652,665 filed on May 29, 2012, the complete disclosure of which, in its entirety, is herein incorporated by reference.

BACKGROUND

Technical Field

The embodiments herein generally relate to wireless technologies, and more particularly to WiFi and Bluetooth® technologies.

Description of the Related Art

A contention-based protocol (CBP) is a telecommunications media access protocol allowing several users to share the same broadcast medium (e.g., spectrum) by defining the events that must occur when multiple transmitters simultaneously try to access the same channel, and establishing rules for allowing a transmitter to provide reasonable chances for other transmitters to operate. The simultaneous transmissions may result in collisions whereby multiple data transfer demands are simultaneously made on equipment that can handle only one transmission at any given time. In order to help with collision avoidance or recovery after collisions occur, the CBP protocol includes procedures for initiating new data signal transmissions, determining whether the channel is available or unavailable (e.g., state of the channel), and managing retransmissions of data signals in the event of a busy channel. Such protocols are helpful when the wireless standards are the same. However, when the wireless standards are different (e.g., WiFi and Bluetooth® technologies), then the protocols are not sufficient. For example, a bias occurs in WiFi contention and a WiFi user has less chance to access data than other WiFi users without Bluetooth®. Accordingly, there remains a need for a new technique that eliminates this bias and permits media contention in the presence of conflicting (e.g., different wireless standard) wireless operation.

SUMMARY

In view of the foregoing, an embodiment herein provides a method of performing unbiased media contention in a presence of conflicting wireless operation of data transmission, the method comprising beginning media contention only during Bluetooth® operation; treating the Bluetooth® operation as a rejection of media transmission; holding a backoff timer associated with a backoff period steady for a specified duration; upon immediate completion of the Bluetooth® operation, WiFi contends with a small backoff value when media access is busy; using a small random number for the backoff period during a non-Bluetooth® data transfer period; and keeping an overall backoff timer unbiased for a duration of the data transmission. The specified duration may comprise an end of the Bluetooth® operation. Alternatively, the specified duration may comprise a maximum backoff time is reached. The random number for the backoff period comprises uniform distribution in a contention window. A mean backoff timer value equals a uniform mean value minus a ratio of a Bluetooth® operation period to a total backoff period. The method may further comprise using a combination WiFi and Bluetooth® chip to perform the unbiased media contention. The method may further comprise preventing WiFi media contention during the Bluetooth® operation. The method may further comprise immediately sensing media access upon completion of the Bluetooth® operation. The Bluetooth® operation has timing constraints and can only occur during a Bluetooth® data transfer period. The WiFi and Bluetooth® signals are shared and coexist in a time domain.

Another embodiment provides a system of performing unbiased media contention in a presence of conflicting wireless operation of data transmission, the system comprising a processor that begins media contention only during Bluetooth® operation and treats the Bluetooth® operation as a rejection of media transmission; and a backoff timer in communication with the processor and associated with a backoff period that is held steady for a specified duration, wherein the processor determines an immediate completion of the Bluetooth® operation and permits WiFi contention with a small backoff value when media access is busy, wherein the backoff timer uses a small random number for the backoff period during a non-Bluetooth® data transfer period, and wherein an overall backoff timer is kept unbiased for a duration of the data transmission. The specified duration comprises an end of the Bluetooth® operation. Alternatively, the specified duration comprises a maximum backoff time is reached. The random number for the backoff period comprises uniform distribution in a contention window. A mean backoff timer value equals a uniform mean value minus a ratio of a Bluetooth® operation period to a total backoff period. A combination WiFi and Bluetooth® chip is used to perform the unbiased media contention. The WiFi media contention is prevented during the Bluetooth® operation. The processor immediately senses media access upon completion of the Bluetooth® operation. The Bluetooth® operation has timing constraints and can only occur during a Bluetooth® data transfer period. The WiFi and Bluetooth® signals are shared and coexist in a time domain.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

Figure 1:
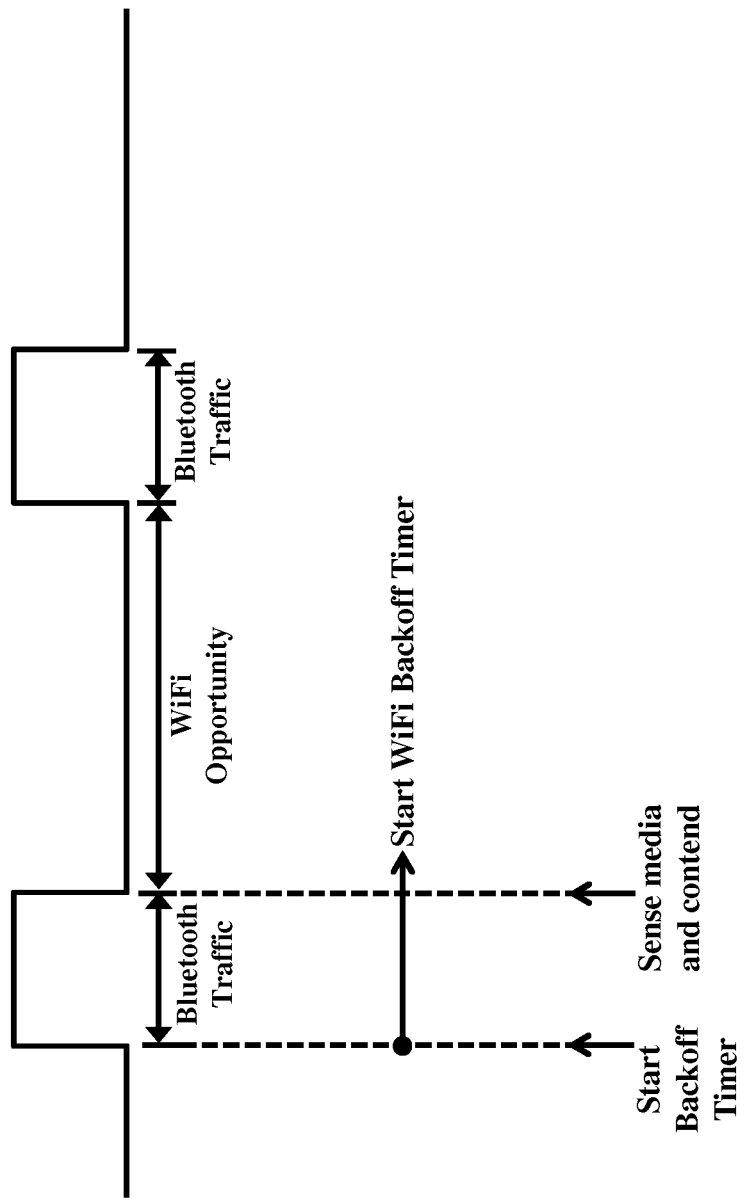
FIG. 1 illustrates a waveform diagram of unbiased WiFi media contention in the presence of Bluetooth® signal operation according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein provide an unbiased WiFi media contention in the presence of Bluetooth® operation. Referring now to the drawings, and more particularly to FIGS. 1 through 5, where similar reference characters denote corresponding features consistently throughout the figures, there are shown preferred embodiments.

Figure 5:
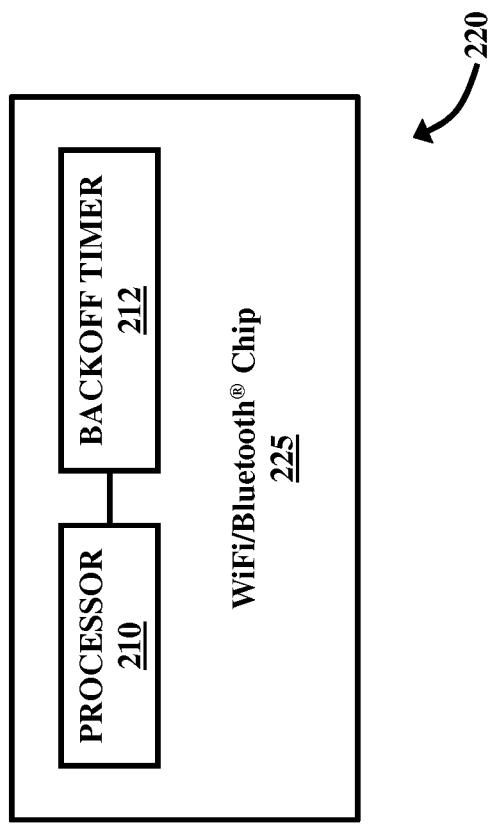
FIG. 5 is a system block diagram according to an embodiment herein.

The embodiments herein utilize a WiFi and Bluetooth® combination chip 22 (of FIG. 5). In accordance with FIG. 1, WiFi has to backoff from data transfer for a random period of time before contending for media if the media is busy. The backoff period is a random number with uniform distribution between zero and a maximum (e.g., the contention window (CW)). When Bluetooth® transmission is operational, then WiFi is prohibited to contend during Bluetooth® operation.

Figure 2:
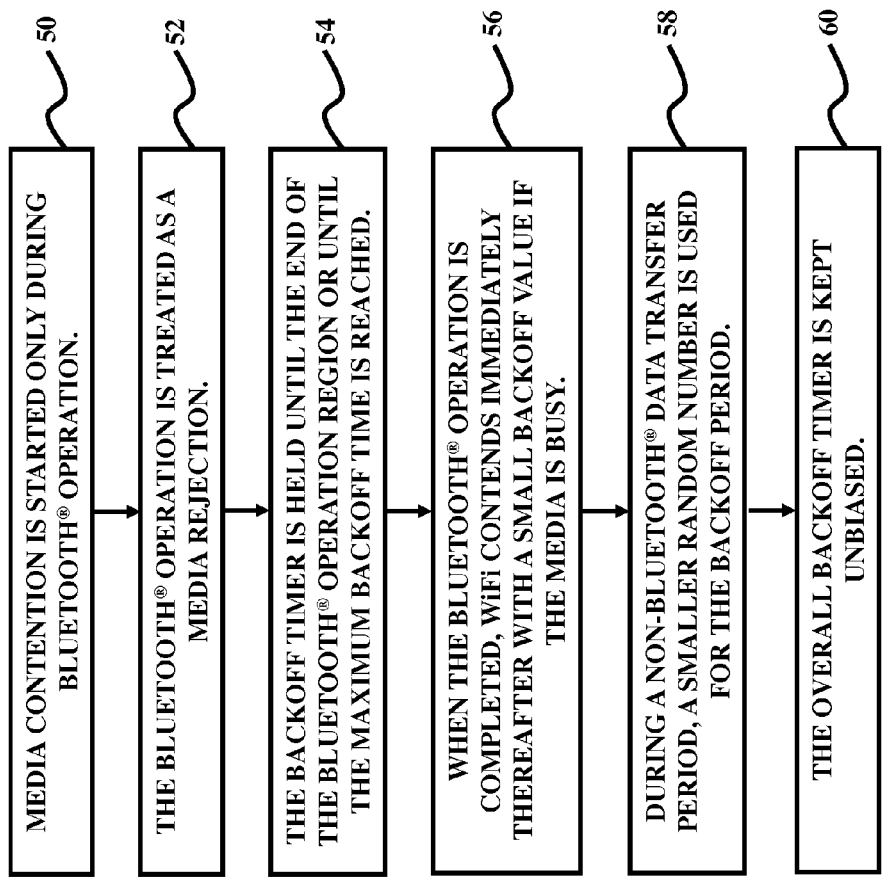
FIG. 2 illustrates a block diagram of a receiver according to an embodiment herein.
Figure 3:
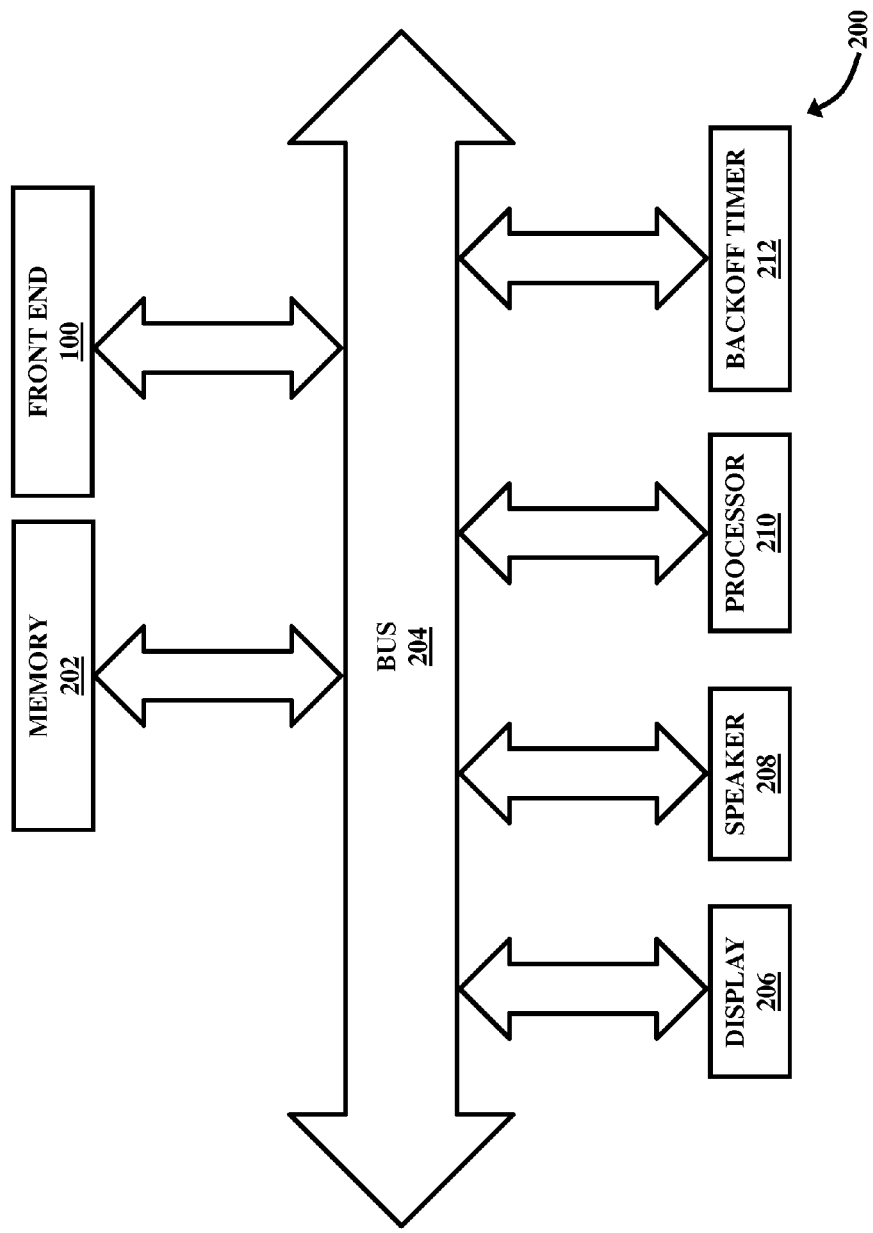
FIG. 3 illustrates a block diagram of a computer system according to an embodiment herein.

The embodiments herein provide a technique to remove this bias as indicated in FIG. 2, with reference to FIGS. 1, 3, and 5. First (50), media contention is started by the processor 210 (of FIGS. 3 and 5) only during Bluetooth® operation. Second (52), the Bluetooth® operation is treated as a media rejection. Third (54), the backoff timer 212 (of FIGS. 3 and 5) is held until the end of the Bluetooth® operation region or until the maximum backoff time is reached. The backoff period is used to initiate the backoff timer 212. Fourth (56), when the Bluetooth® operation is completed, WiFi contends immediately thereafter with a small backoff value if the media is busy. The backoff value is used for scheduling a next attempted retransmission. Fifth (58), during a non-Bluetooth® data transfer period, a smaller random number is used for the backoff period. Sixth (60), the overall backoff timer 212 is kept unbiased. The timer mean value can be calculated as follows:

$$\text{Timer mean} = \text{Uniform mean} - \frac{\text{Bluetooth operation period}}{\text{Total backoff period}}$$

FIG. 3, with reference to FIGS. 1 through 2, illustrates an exploded view of a receiver 200 having a memory 202 comprising a computer set of instructions. The receiver 200 further includes a bus 204, a display 206, a speaker 208, and a processor 210 capable of processing a set of instructions to perform any one or more of the methodologies herein, according to an embodiment herein. The processor 210 may also enable analog content to be consumed in the form of output via one or more displays 206 or audio for output via speaker and/or earphones 208. The processor 210 and backoff timer 212 may also carry out the methods described herein and in accordance with the embodiments herein. The content may also be stored in the memory 202 for future processing or consumption. A user of the receiver 200 may view this stored information on display 206. When the content is selected, the processor 210 may pass information. The content may be passed among functions within the receiver 200 using bus 204. The receiver 200 may be operatively connected to a front end 100 for communication within a wireless communication network 25 (of FIG. 4).

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The embodiments herein can include both hardware and software elements. The embodiments that are implemented in software include but are not limited to, firmware, resident software, microcode, etc.

Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 4:
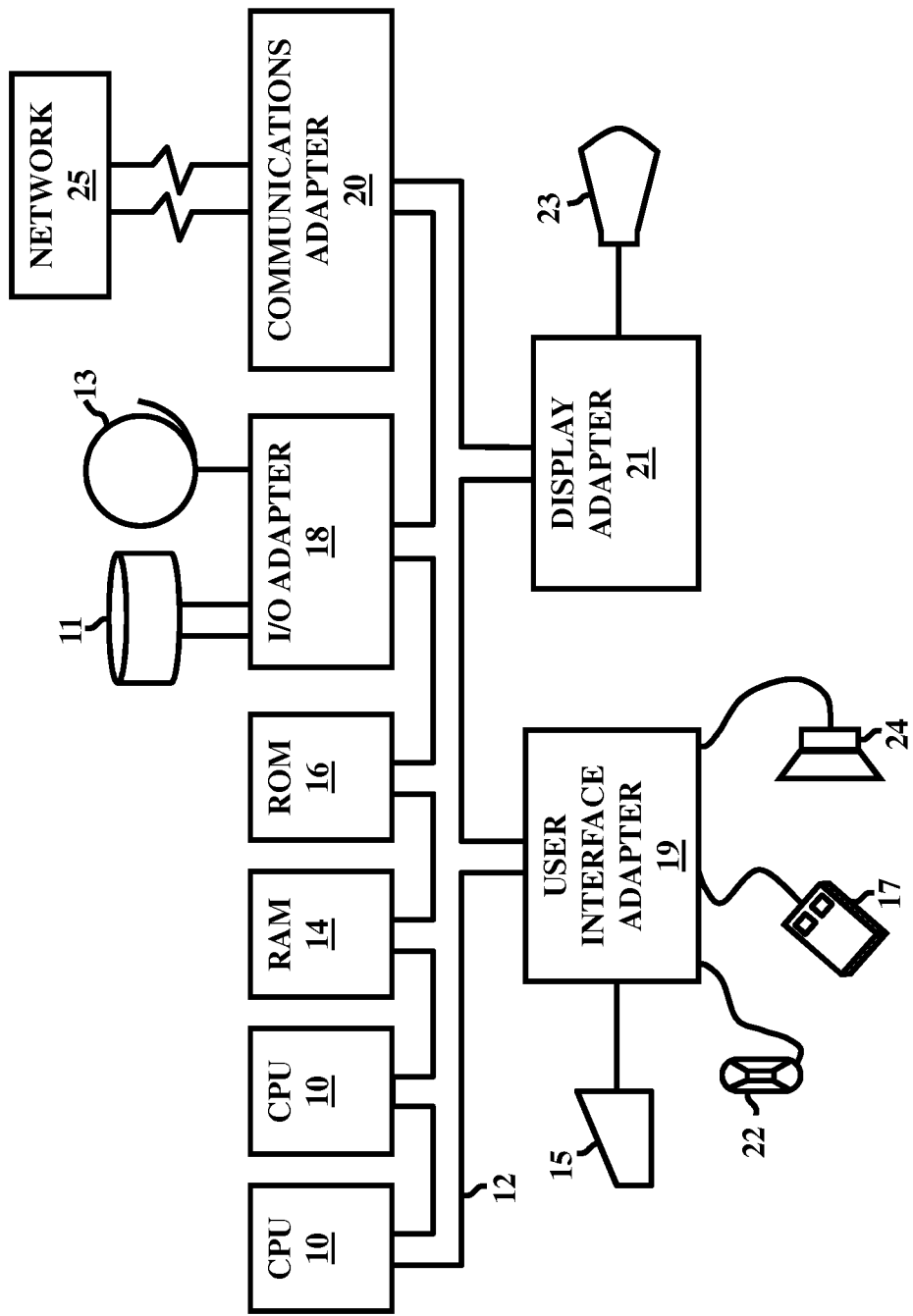
FIG. 4 is a flow diagram illustrating a method according to an embodiment herein.

A representative hardware environment for practicing the embodiments herein is depicted in FIG. 4, with reference to FIGS. 1 through 3. This schematic drawing illustrates a hardware configuration of an information handling/computer system in accordance with the embodiments herein. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

FIG. 5, with reference to FIGS. 1 through 4, illustrates a system block diagram according to an embodiment herein. The system 220 performs unbiased media contention in the presence of conflicting wireless operation of data transmission, wherein the system comprises a processor 210 that begins media contention only during Bluetooth® operation and treats the Bluetooth® operation as a rejection of media transmission. A backoff timer 212 is in communication with the processor 210 and is associated with a backoff period that is held steady for a specified duration, wherein the processor 210 determines an immediate completion of the Bluetooth® operation and permits WiFi contention with a small backoff value when media access is busy, wherein the backoff timer uses a small random number for the backoff period during a non-Bluetooth® data transfer period, and wherein the overall backoff timer 212 is kept unbiased for a duration of the data transmission. The specified duration comprises an end of the Bluetooth® operation. Alternatively, the specified duration comprises a maximum backoff time is reached.

The random number for the backoff period comprises uniform distribution in a contention window. A mean backoff timer value equals a uniform mean value minus a ratio of a Bluetooth® operation period to a total backoff period. A combination WiFi and Bluetooth® chip 225 is used to perform the unbiased media contention. The WiFi media contention is prevented during the Bluetooth® operation. The processor 210 immediately senses media access upon completion of the Bluetooth® operation. The Bluetooth® operation has timing constraints and can only occur during a Bluetooth® data transfer period. The WiFi and Bluetooth® signals are shared and coexist in a time domain.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A method of performing unbiased media contention in a presence of conflicting wireless operation of data transmission, the method comprising:
    determining, by a processor, an end of a first wireless transmission using a first wireless communications protocol;
    determining, by the processor, a media contention for the wireless medium associated with a second wireless communications protocol, where the second wireless communications protocol is different than the first wireless communications protocol;
    determining, by the processor, a backoff time for the media contention, where the backoff time is determined based on a random number and a duration of the first wireless transmission, wherein the backoff time is a mean backoff time equal to a uniform mean backoff time minus a ratio of the first wireless transmission duration to a total backoff period;
    determining, by the processor, if the backoff time is reached by a backoff timer; and
    responsive to the backoff time being reached, starting, by the processor, the second wireless transmission using the second wireless communications protocol.

2. The method of claim 1, wherein the first wireless communications protocol is Bluetooth® and the second wireless communications protocol is WiFi®.

3. The method of claim 1, wherein the random number is based on a uniform distribution of backoff time values over a media contention time window.

4. A system of performing unbiased media contention in a presence of conflicting wireless operation of data transmission, the system comprising:
    a processor;
    a memory coupled to the processor and storing instructions, which, when executed by the processor, cause the processor to perform operations comprising:
        determining an end of a first wireless transmission using a first wireless communications protocol;
        determining a media contention for the wireless medium associated with a second wireless communications protocol that is different than the first wireless communications protocol;
        determining a backoff time for the media contention, where the backoff time is determined based on a random number and a duration of the first wireless transmission, wherein the backoff time is a mean backoff time equal to a uniform mean backoff time minus a ratio of the first wireless transmission duration to a total backoff period;
determining if the backoff time is reached by a backoff timer; and
responsive to the backoff time being reached by the backoff timer, starting the second wireless transmission using the second wireless communications protocol.

5. The system of claim 4, wherein the first wireless communications protocol is Bluetooth® and the second wireless communications protocol is WiFi®.

6. The system of claim 4, wherein the random number is based on a uniform distribution of backoff time values over a media contention time window.

7. The system of claim 4, wherein the system is included in a single integrated circuit chip.

8. An integrated circuit device comprising:
a timer;
a processor configured to:
determine an end of a first wireless transmission using a first wireless communications protocol;
determine a media contention for the wireless medium associated with a second wireless communications protocol that is different than the first wireless communications protocol;
determine a backoff time for the media contention, where the backoff time is determined based on a random number and a duration of the first wireless transmission, wherein the backoff time is a mean backoff time equal to a uniform mean backoff time minus a ratio of the first wireless transmission duration to a total backoff period;
determine if the second backoff time is reached by the timer; and
responsive to the backoff time being reached by the timer, start the second wireless transmission using the second wireless communications protocol.

9. The device of claim 8, wherein the first wireless communications protocol is Bluetooth® and the second wireless communications protocol is WiFi®.

10. The device of claim 8, wherein the random number is based on a uniform distribution of backoff time values over a media contention time window.

\* \* \* \* \*